United States Patent [19]

Margerum

[11] Patent Number: 5,205,315

[45] Date of Patent: Apr. 27, 1993

[54] AUTOMATIC WET TANK DRAIN VALVE

[76] Inventor: Wayne R. Margerum, 15 Alden Ave., Delran, N.J. 08075

[21] Appl. No.: 833,018

[22] Filed: Feb. 10, 1992

Related U.S. Application Data

[63] Continuation-in-part of Ser. No. 529,145, May 25, 1990, abandoned, which is a continuation of Ser. No. 331,595, Mar. 30, 1989, Pat. No. 4,928,724.

[51] Int. Cl.$^5$ ............................................. B01D 5/00
[52] U.S. Cl. .................................... 137/204; 137/203
[58] Field of Search .............................. 137/203, 204

[56] References Cited

U.S. PATENT DOCUMENTS

| | | | |
|---|---|---|---|
| 2,509,597 | 5/1950 | Hamilton | 137/204 |
| 2,509,880 | 5/1950 | Pelton | 137/204 |
| 3,101,091 | 8/1963 | Schultz | 137/204 |
| 4,987,919 | 1/1991 | Boutin | 137/204 |

*Primary Examiner*—Alan Cohan
*Attorney, Agent, or Firm*—Norman E. Lehrer

[57] ABSTRACT

The manual valve normally attached to the wet tank of an air pressure system in a motor vehicle which accumulates moisture is replaced by an automatic valve which has an inlet port connected to the drain line from the wet tank and an outlet port vented to the atmosphere. This valve is operable between an open position where the inlet and outlet ports are interconnected and a closed position where these two ports are isolated from each other. An air line which is used to activate the valve is interconnected to the parking brake of the motor vehicle and is operable to move the valving means to the closed position during normal operation of the vehicle and to the open position whenever the parking brake is engaged to thereby automatically drain moisture from the wet tank while the vehicle is parked.

2 Claims, 2 Drawing Sheets

AUTOMATIC WET TANK DRAIN VALVE

This application is a continuation in part of application Ser. No. 529,145, filed May 25, 1990, now abandoned which is a continuation of application Ser. No. 331,595, filed Mar. 30, 1989, now U.S. Pat. No. 4,928,724.

BACKGROUND OF THE INVENTION

The present invention relates to apparatus for the draining of accumulated moisture from the air pressure system of vehicles and, more particularly, to apparatus for periodically draining the moisture automatically.

A common form of braking system in large trucks is a type which operates utilizing air pressure. The truck engine operates an air compressor which provides the pressure for the braking system. The air pressure is stored generally in a pressure storage tank appropriately located within the vehicle in order that a constant pressure supply may be available.

During operation of the air compressor, air is pulled from the atmosphere and compressed by the air compressor. Atmospheric air contains moisture which, upon compression, causes the moisture to condense. Throughout continued use of the pressure system, the moisture will build up in the form of liquid in the pressure storage tank.

Continued presence of moisture in the air brake system can cause considerable harm to the system and even brake failure. For example, the moisture can cause deterioration of rubber seals and the like. Additionally, in cold weather, where the moisture has migrated into the pressure lines and other aspects of the braking system, it can freeze causing malfunction or total failure of the braking system.

For the foregoing reasons, it is essential that the moisture, which eventually accumulates in the pressure storage tank, be drained from the tank before it builds to a level to migrate into the remainder of the braking system. A conventional means for removing moisture from the braking system and, more particularly, from the pressure storage tank is to utilize a separate tank positioned adjacent to the pressure storage tank and interconnected with the pressure storage tank by means of a check valve. This separate tank, known as a wet tank, will collect the liquid or moisture in a manner well known in the art.

During normal operation, the wet tank, which has a drain valve in the bottom thereof, operates with the drain valve closed thereby allowing moisture to accumulate therein. Periodically and usually at the end of every day when the vehicle is shut down, the drain valve on the wet tank is manually opened. The check valve between the pressure storage tank and wet tank will then go into a closed position and the moisture which has accumulated in the wet tank, by means of the pressure already present therein, will blow the moisture out of the wet tank and purge the system.

The foregoing system for draining of moisture from the air braking system of a vehicle, if operated properly, will be effective. However, one of the severe drawbacks of such a system is that the operators of the vehicle forget to drain the wet tank. After a period of time, the wet tank will fill and the moisture will enter the pressure storage tank and ultimately the remainder of the system with grave consequences.

What is needed in the industry is a means by which the wet tank can be periodically drained automatically. Equally important, however, is that such an automatic draining system be of the type and nature that a failure of the system to drain will work in a fail-safe mode, i.e. upon a failure of the drain system to work automatically, pressure will not be released from the pressure system which would, of course, render the braking system inoperative and thus create a dangerous situation.

Applicant's prior U.S. Pat. No. 4,928,724 proposed a system for accomplishing this result by providing an arrangement which automatically drained accumulated moisture from the wet tank whenever the vehicle was placed in a shutdown mode. That is, an electrically operated solenoid opened a valve each time that the ignition key to the vehicle was turned off. While this system was an advance over prior art manual systems, it also suffered from several deficiencies.

One major deficiency of the prior art patented system was its cost. The combination of the pressure activated valve and solenoid made the arrangement somewhat costly and also more difficult to install. A more serious problem, however, was the prior system's inability to accomplish its desired result under certain conditions.

It is common practice for truck drivers during long cold trips to never turn their truck off. When taking a break or stopping for a meal, a truck driver frequently leaves the engine running. It would not be uncommon for the engine to run for 10, 12 or 14 hours continuously without ever being shut off. Since applicant's prior patented system drained the wet tank only during shutdown of the vehicle, the wet tank would not be drained during the entire 12- or 14-hour period that the truck was running. This creates particularly serious problems during very cold weather which is also the type of weather wherein a truck driver tends to leave the engine running.

Prior U.S. Pat. No. 3,101,091 to Schultz also proposes a system which is intended to automatically discharge accumulated moisture in the air compressor system of a vehicle. The Schultz system includes a pressure-activated valve which has a reservoir contained therein which is capable of holding a small amount of accumulated moisture and air. This valve is actuated every time the truck's brakes are depressed. While the Schultz system may have some advantages over other prior systems, it is capable of removing only a very small amount of moisture each time that it is activated and it can be more easily worn since it is activated so frequently. Furthermore, should a defect occur in the Schultz device, the entire braking system of the truck can be jeopardized.

SUMMARY OF THE INVENTION

The automatic wet tank drain valve assembly of the present invention is designed to overcome all of the difficulties of the manual wet tank drain valves heretofore used and also the deficiencies of prior automatic systems discussed above. According to the invention, the manual valves normally attached to the wet tank of an air pressure system in a motor vehicle which accumulates moisture are replaced by an automatic valve which has an inlet port connected to the drain line from the wet tank and an outlet port vented to the atmosphere. This valve is operable between open and closed positions. Valve actuation means in interconnected to the parking brake of the motor vehicle and is operable to move the valving means to a closed position during normal operation of the vehicle and to an open position whenever the parking brake is engaged to automatically drain moisture from the wet tank while the vehicle is parked. The valve will open to drain moisture from the wet tank even if the engine of the vehicle remains running as long as the parking brake is engaged.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
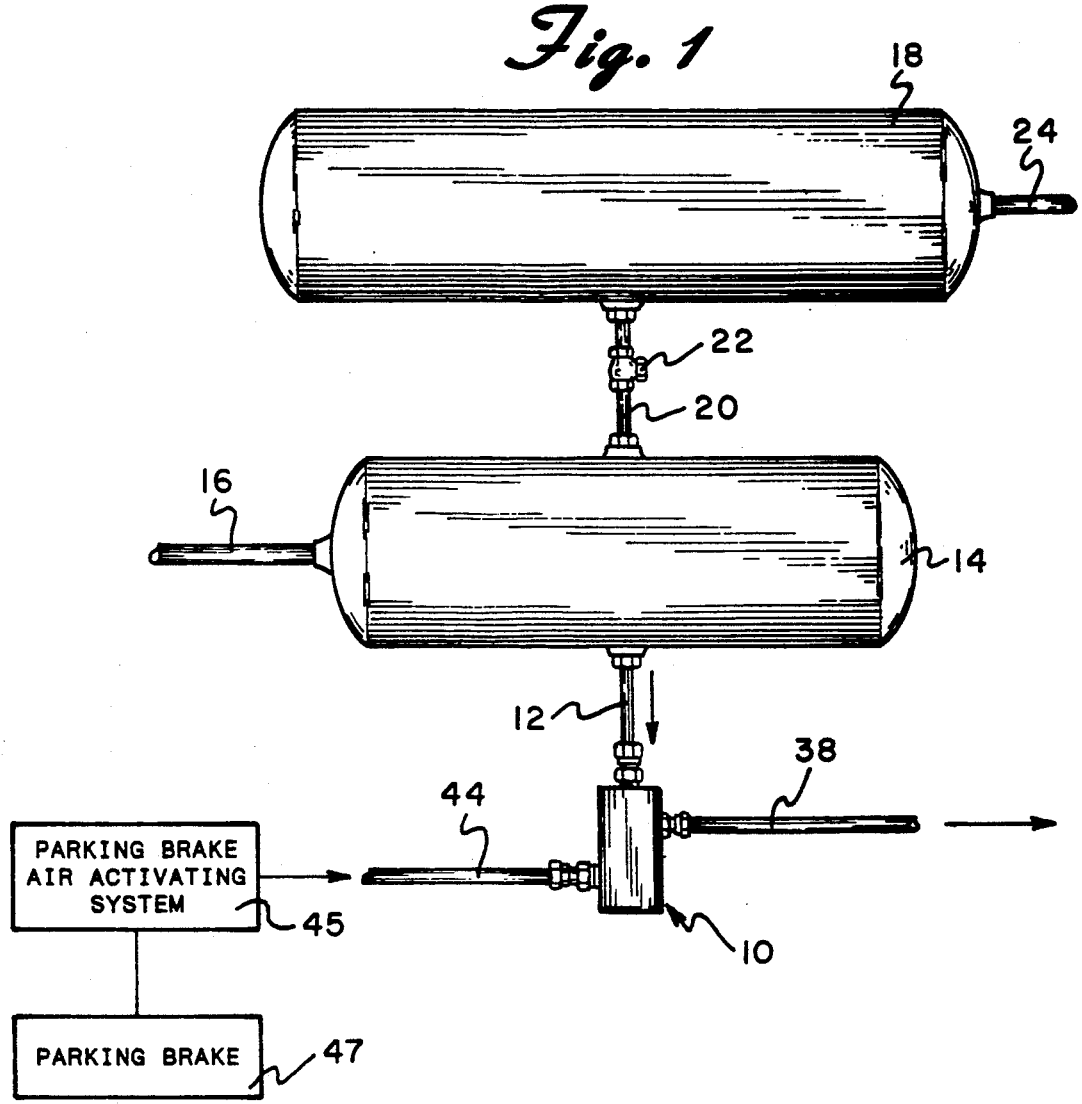
FIG. 1 is an elevational view of the valve assembly of the present invention in conjunction with a storage pressure tank and wet tank and showing the various pneumatic plumbing involved.
Figure 2:
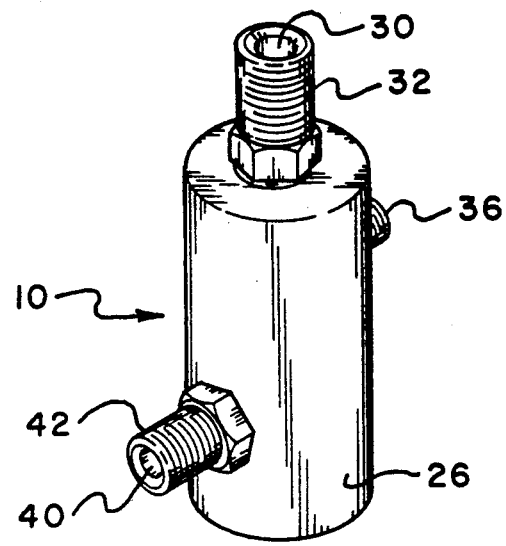
FIG. 2 is a prospective view of the automatic wet tank valve assembly of the present invention.

Referring now to the drawings in detail wherein like reference numerals have been utilized throughout the various figures to designate like elements, there is shown in each of the figures a wet tank drain valve assembly of the present invention which is designated generally as 10. Valve assembly 10 is shown in FIG. 1 connected to the drain line 12 of a wet tank 14. The automatic valve assembly 10 replaces the manual valve which would normally be connected to the drain line 12.

As is well known in the art, input line 16 to the wet tank 14 is connected to an air compressor, not shown. The wet tank 14 is also connected to a pressure storage tank 18 in a known manner through the line 20 and check valve 22. Check valve 22 allows air under pressure to flow from the tank 14 into the tank 18 but does not allow flow in the reverse direction. Line 24 from the pressure storage tank 18 is connected to the braking system of the truck or other motor vehicle in a conventional manner.

The valve assembly 10 itself is comprised of a substantially cylindrically-shaped housing 26 having an elongated cylindrical cavity or bore 28 at the center thereof. An inlet port 30 is formed at the top of the housing 26 and, through the use of a coupler 32 connects the bore 28 to the drain line 12 of the wet tank 14. The housing 26 also includes an outlet or drain port 34 which, through the use of coupling member 36 can connect the bore 28 with exhaust line 38 which is open to the atmosphere. A third port 40 connects the bore 28 through the coupling member 42 to line 44. Line 44 is connected to the maxi brake chamber (not shown) of the parking brake air activating system 45 of the air braking system of the motor vehicle. Line 44 is connected to the maxi brake chamber in such a way that when the vehicle parking brake 47 is set, there is no air pressure in the line 44. However, when the vehicle parking brake is not activated, there is normal air pressure in the line 44. This normal air pressure is usually approximately 120 psi.

Figure 3:
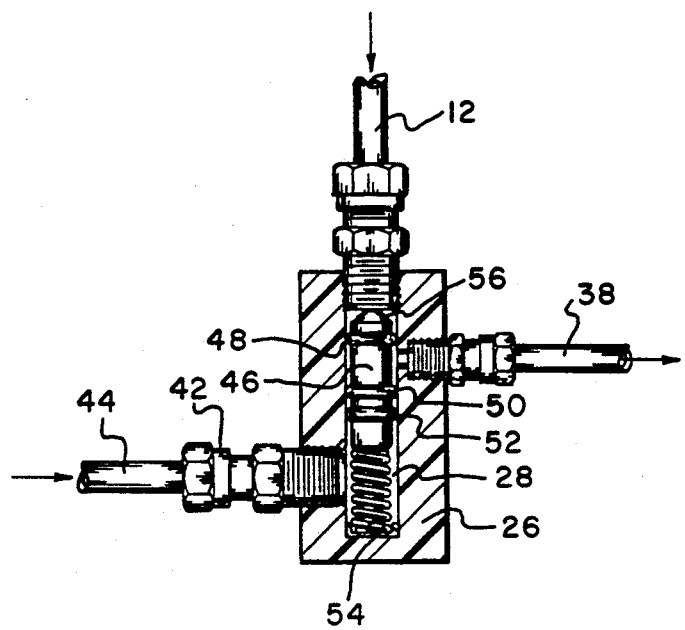
FIG. 3 is an elevational view shown partly in cross section of the wet tank drain valve of the present invention in the closed position.
Figure 5:
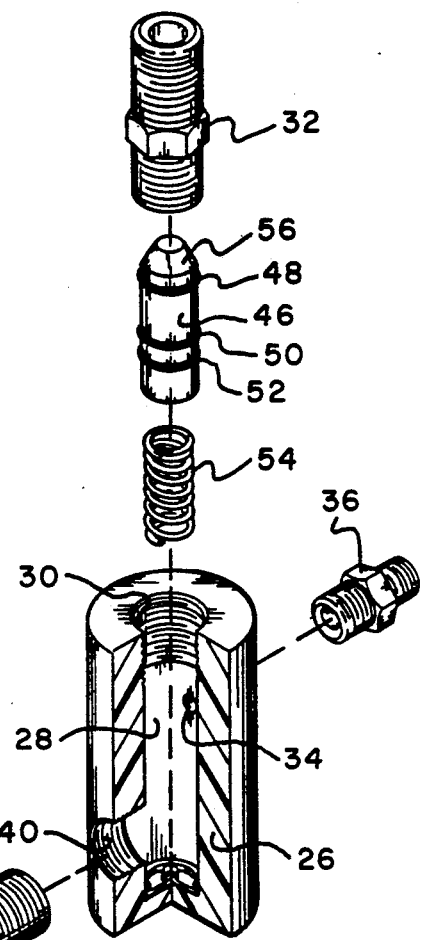
FIG. 5 is an exploded prospective view of the wet tank drain valve assembly of the present invention shown partially in cross section.
Figure 4:
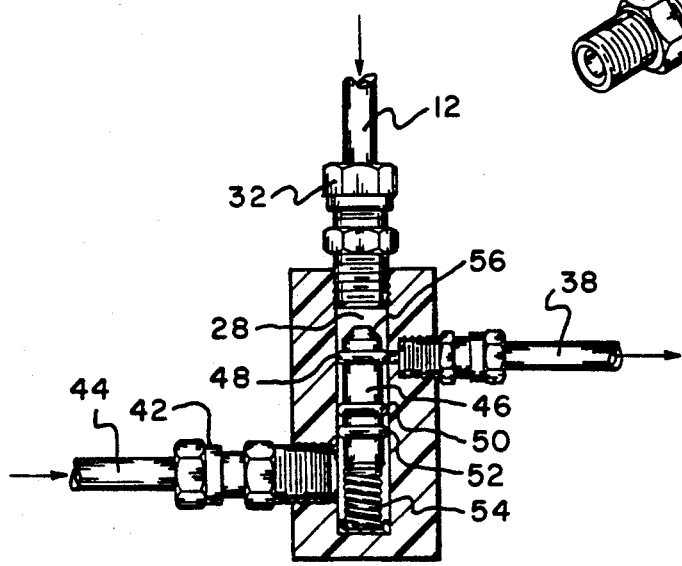
FIG. 4 is an elevational view shown partly in cross section of the wet tank drain valve of the present invention in the open position.

Located within the bore 28 of the valve housing 26 is an elongated movable piston 46. As is best shown in FIGS. 3, 4 and 5 piston 46 is substantially cylindrically-shaped but includes three enlarged annular members 48, 50 and 52 on the outer surface thereof. These annular members are larger than the main body portion of the piston 46 and engage the inner wall of the bore 28 to form an airtight seal therebetween. The annular members 48, 50 and 52 may be O-rings carried by the piston 46 or, and as is preferred, the annular members 48, 50 and 52 may be integral with the piston body 46 and molded therewith at the same time that the body itself is being formed.

Carried within the bore 28 of the valve housing 26 and below the piston 46 is a coil spring 54. Spring 54 normally biases the piston 46 into its full raised or closed position as shown in FIG. 3. Preferably the force of the spring 54 is approximately 35 pounds. The top 56 of the piston 46 is tapered or conically-shaped so that when it is in its uppermost closed position, it engages the lowermost portion of the coupling 32 and forms a tight seal therewith in order to close the port 30.

The annular seal members 48, 50 and 52 are arranged on the piston 46 in such a way that the port 40 is never in communication with either of the other ports 30 or 34. Port 40 is only in communication with the bore of the piston located beneath the annular member 52 irrespective of the position of the piston 46. When the piston 46 is in its fully raised or closed position, port 30 is closed and even if the piston is moved down slightly, annular member 48 prevents communication from the port 30 to the port 34. However, when the piston 46 is moved downwardly into its lower or open position, there is communication between the port 30 and the port 34 and, thus, between the wet valve drain line 12 and the exhaust line 38.

The valve assembly of the present invention operates in the following manner. When the vehicle is in its normal operating condition, the pressure in line 44 from the maxi brake chamber is substantially equal to the pressure in drain line 12 of the wet tank 14. The pressure above and below the piston 46 is, therefore, substantially equal. With these pressures substantially equal, spring 54 biases the piston into its full upward position as shown in FIG. 3. In this position, the top 56 of the piston 46 engages the lowermost portion of the coupling 32 and forms a tight seal therewith to close the port 30. Any moisture which has accumulated in the tank 14 remains in the bottom of the tank and, of course, in the drain line 12. Furthermore, and is well known in the art, air under pressure remains above the accumulated moisture in the wet tank 14.

Whenever the parking brake is set, whether or not the engine remains running, the pressure in line 44 drops to substantially zero thereby allowing the pressure of the accumulated moisture and air in drain line 12 to overcome the force of spring 54 and move the piston 46 downwardly as shown in FIG. 4. In this position, the accumulated moisture flows through the line 12 into the upper portion of the bore 28 and through the port 34 to the exhaust line 38 where the moisture is vented to the atmosphere. When the parking brake is released, air pressure again builds up in line 44 and the piston 46 moves back up to the position shown in FIG. 3.

The present invention may be embodied in other specific forms without departing from the spirit or essential attributes thereof and accordingly reference should be made to the appended claims rather than to the foregoing specification as indicating the scope of the invention.

What is claimed is:

1. Apparatus for use in an automotive air pressure system of a vehicle having a parking brake activated by a parking brake air activating system, said air pressure system employing an air pressure tank, a wet tank for accumulating moisture within the system, a drain line and valving for draining the moisture from the wet tank, the improvement providing for automatic draining of the wet tank comprising:

valving means having an inlet port connected to the drain line and an outlet port vented to atmosphere and including a valve body having a valve bore therein, a valve piston movable within the valve bore between an open position wherein there is communication between said inlet and said outlet ports and a closed position wherein there is no communication between said inlet and outlet ports and a spring urging the piston into said closed position; and an air line connected to the parking brake air activating system of the vehicle to apply air pressure to the piston during vehicle operation, said air pressure to the piston urging said piston into said closed position along with said spring during vehicle operation and urging said piston to said open position whenever the parking brake is engaged.

2. The apparatus of claim 1 wherein there is air under pressure within said wet tank which, through said inlet port, urges said piston in said open position, the force of said spring urging said piston into said closed position being less than the force on said piston from said wet tank and wherein there is substantially reduced pressure in said line connected to the parking brake air system when the parking brake is engaged thereby allowing said piston to move into its open position.

* * * * *

REEXAMINATION CERTIFICATE (3688th)

United States Patent [19]

Margerum

[11] B1 5,205,315

[45] Certificate Issued Dec. 15, 1998

[54] AUTOMATIC WET TANK DRAIN VALVE

[75] Inventor: Wayne R. Margerum, Delran, N.J.

[73] Assignee: Augustine J. Matteo, Jr., Westville, N.J.

Reexamination Request:
No. 90/004,984, May 7, 1998

Reexamination Certificate for:
Patent No.: 5,205,315
Issued: Apr. 27, 1993
Appl. No.: 833,018
Filed: Feb. 10, 1992

Related U.S. Application Data

[63] Continuation-in-part of Ser. No. 529,145, May 25, 1990, abandoned, which is a continuation of Ser. No. 331,595, Mar. 30, 1989, Pat. No. 4,928,724.

[51] Int. Cl.[6] ............................................. B01D 5/00
[52] U.S. Cl. ................................. 137/204; 137/203
[58] Field of Search .......................... 137/203, 204

[56] References Cited

U.S. PATENT DOCUMENTS

| | | |
|---|---|---|
| 2,509,597 | 5/1950 | Hamilton ........................ 137/204 |
| 2,509,880 | 5/1950 | Pelton ............................. 137/204 |
| 3,101,091 | 8/1963 | Schultz ........................... 137/204 |
| 4,883,995 | 11/1989 | Rink, Jr. ...................... 137/204 X |
| 4,987,919 | 1/1991 | Boutin ........................... 137/204 |

*Primary Examiner*—Gerald A. Michalsky

[57] ABSTRACT

The manual valve normally attached to the wet tank of an air pressure system in a motor vehicle which accumulates moisture is replaced by an automatic valve which has an inlet port connected to the drain line from the wet tank and an outlet port vented to the atmosphere. This valve is operable between an open position where the inlet and outlet ports are interconnected and a closed position where these two ports are isolated from each other. An air line which is used to activate the valve is interconnected to the parking brake of the motor vehicle and is operable to move the valving means to the closed position during normal operation of the vehicle and to the open position whenever the parking brake is engaged to thereby automatically drain moisture from the wet tank while the vehicle is parked.

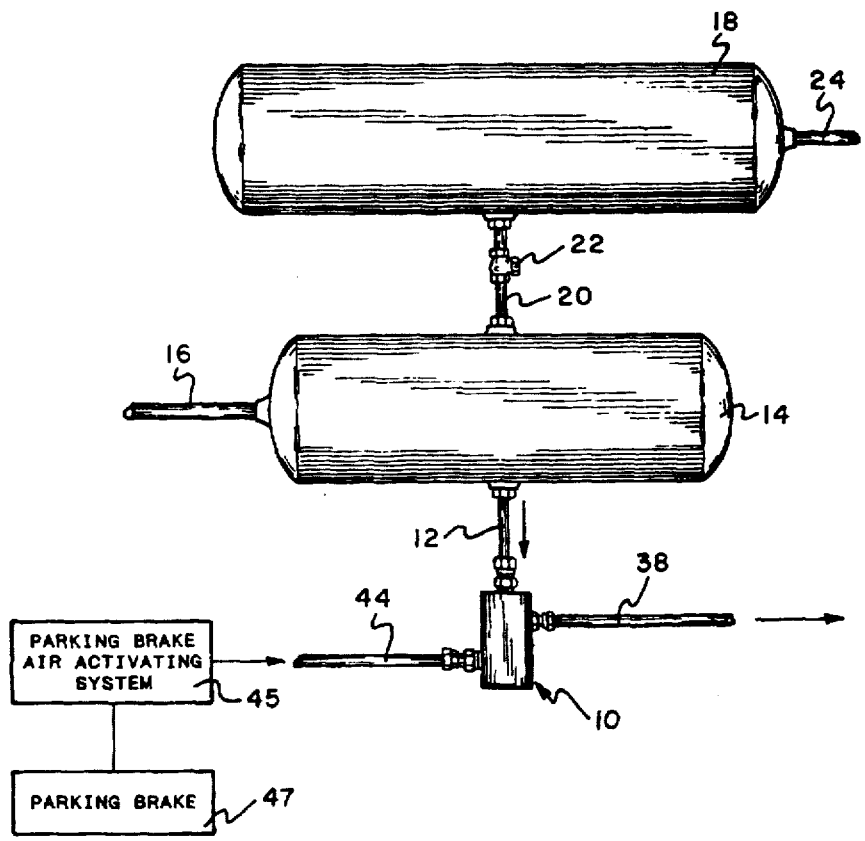

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *